United States Patent
Monot et al.

(10) Patent No.: US 6,349,207 B1
(45) Date of Patent: Feb. 19, 2002

(54) METHOD AND DEVICE FOR ANALYZING INTERFERENCE IN A CELLULAR RADIOCOMMUNICATION SYSTEM

(75) Inventors: Jean-Jacques Monot, Courdimanche; Francois Pipon; Frédérique Lasnier, both of Paris, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/147,822

(22) PCT Filed: Jul. 10, 1998

(86) PCT No.: PCT/FR98/01511

§ 371 Date: Mar. 15, 1999

§ 102(e) Date: Mar. 15, 1999

(87) PCT Pub. No.: WO99/04588

PCT Pub. Date: Jan. 28, 1999

(30) Foreign Application Priority Data

Jul. 15, 1997 (FR) ............................................. 97 08954

(51) Int. Cl.[7] ........................... H04Q 7/20; H04B 15/00
(52) U.S. Cl. ....................... 455/423; 455/446; 455/502; 455/524
(58) Field of Search ................................ 455/423, 296, 455/502, 503, 1, 515, 446, 561, 524, 65, 278.1

(56) References Cited

U.S. PATENT DOCUMENTS

| | | | | |
|---|---|---|---|---|
| 5,752,168 A | | 5/1998 | Monot et al. | |
| 5,812,090 A | | 9/1998 | Chevalier et al. | |
| 5,848,105 A | * | 12/1998 | Gardner et al. | 375/336 |
| 5,870,430 A | | 2/1999 | Pipon et al. | |
| 5,930,243 A | * | 7/1999 | Parish et al. | 370/334 |
| 5,937,014 A | * | 8/1999 | Pelin et al. | 375/340 |

* cited by examiner

*Primary Examiner*—Dwayne Bost
*Assistant Examiner*—Erika A. Gary
(74) *Attorney, Agent, or Firm*—Oblon, Spivak, McClelland, Maier & Neustadt, P.C.

(57) ABSTRACT

A system for analyzing interference caused by neighboring cells in a cellular communication system. A multipath synchronization is performed on the learning sequences of the beacon frequencies in order to determine the number of base stations using the analysis frequency as a beacon frequency. The identifiers of the base stations which are transmitting the beacon frequencies on which a synchronization has been made are demodulated after spatial filtering. A multipath synchronization is performed on learning sequences of the traffic frequencies so as to determine the number of base stations using the analysis frequency as a traffic frequency.

16 Claims, 14 Drawing Sheets

SITE OF THE STAR

THE MOBILE MAKES AN IDENFICATION OF THE
BSICs OF ALL THE STATIONS RECEIVED

METHOD AND DEVICE FOR ANALYZING INTERFERENCE IN A CELLULAR RADIOCOMMUNICATION SYSTEM

BACKGROUND OF THE INVENTION

1. Field of the Invention

The present invention relates to a process and a device for analysing interference in a cellular radiocommunication system of the GSM or DCS 1800 type for example.

2. Discussion of the Background

In a cellular radiocommunication system the coverage of a specified territory is achieved using cells served by base stations and by applying a pattern for reusing frequencies which makes it possible to increase the capacity of the network.

Various types of cells are used. These types consist of macrocells and microcells. A macrocell employs a base station placed on a high point such as the roof of a building and its radius may reach several kilometres. A microcell serves areas of smaller radius of a few hundred metres. It employs a base ministation whose aerial is generally located below the roof of buildings, on lampposts for example.

In these systems the considerable reuse of frequencies, in particular in areas of high subscriber density, gives rise to considerable co-channel interference and interference on adjacent channels. Scheduling of the network is therefore necessary to eliminate this interference. This scheduling is carried out by an operator who has available a number of software and hardware tools enabling him to assess the match between the population of subscribers to be served and the capacity of the network installed.

The software utility allows the operator to plan the siting of the base stations and their characteristics as a function of the population of subscribers to be served.

The hardware utility is transported on vehicles. It comprises a trace function allowing storage of the measurements made on the network.

Within the context of a GSM network, the main problem of interference arises in relation to the downlink between base station and mobile since the base stations are generally placed on high points which are ideal for transmitting signals over long distances. The engineering of the network generally provides for a "tilt", that is to say an inclination of the antennas so as to force the radiation from the base station to cover only the territory inside its cell. However, this "tilt" is not always sufficient to avoid untimely radiations to adjacent cells which are the cause of interference between the transmissions from the various base stations.

The problem is then for the operator to identify the origin of the interference detected in the neighbouring cells. This detection is ordinarily performed with the aid of relatively unsophisticated trace mobiles whose equipment is similar to that with which the customary communication mobiles are equipped. These trace mobiles provide the operator with the information used by the customary mobiles to qualify a communication, that is to say the information RX LEVEL and RX QUAL. This information, whose mode of obtainment is described in the GSM standard, makes it possible to qualify the level of signal received (RX LEVEL) as well as the quality of the communication (RX QUAL). Under these conditions a situation of interference is detected when the level of the signal received is high whilst the quality of the communication is declared to be poor. The problem for the operator is then to identify the jammer while the trace mobile is not providing any identifier or marker therefor.

Furthermore, the software scheduling tools are incapable of handling local features such as for example an opening in a row of buildings which favours undesirable radiations.

The procedure followed by the operator calls greatly on his experience. It consists, by deduction with the aid of the scheduling data base, in identifying the disturbing station by disconnecting it momentarily from the network so as to check the improvement in the quality of the communications. However, these operations remain constraining since on the one hand they require very high terrain experience from the person responsible for performing the analysis and on the other hand the disconnecting of the suspect base stations leads to a worsening of the service. Furthermore, in a highly urbanized configuration as is for example the case in a town such as Paris where the microcellular deployment is substantial, analysis based on experience is hardly to be envisaged any longer.

SUMMARY OF THE INVENTION

The purpose of the invention is to alleviate the aforementioned drawbacks by proposing a solution for the reliable determination of interference between traffic frequencies which do not intrinsically possess markers.

To this end, the subject of the invention is a process for analysing interference in a cellular radio communication system comprising beacon frequencies and traffic frequencies, characterized in that, in order to search on a specified analysis frequency and inside a cell for the origin of interference caused by neighbouring cells, it consists:

in performing a multipath synchronization on the learning sequences of the beacon frequencies so as to determine the number of base stations using the analysis frequency as beacon frequency, in demodulating after spatial filtering the identifiers of the base stations transmitting the beacon frequencies on which a synchronization has been made, in performing a multipath synchronization on the learning sequences of the traffic frequencies so as to determine the number of base stations using the analysis frequency as traffic frequency.

The subject of the invention is also a device for implementing the aforesaid process.

BRIEF DESCRIPTION OF THE DRAWINGS

Other characteristics and advantages of the invention will become apparent from the description which follows given in conjunction with the appended drawings which represent.

DETAILED DESCRIPTION OF THE PREFERRED EMBODIMENTS

Figure 1:
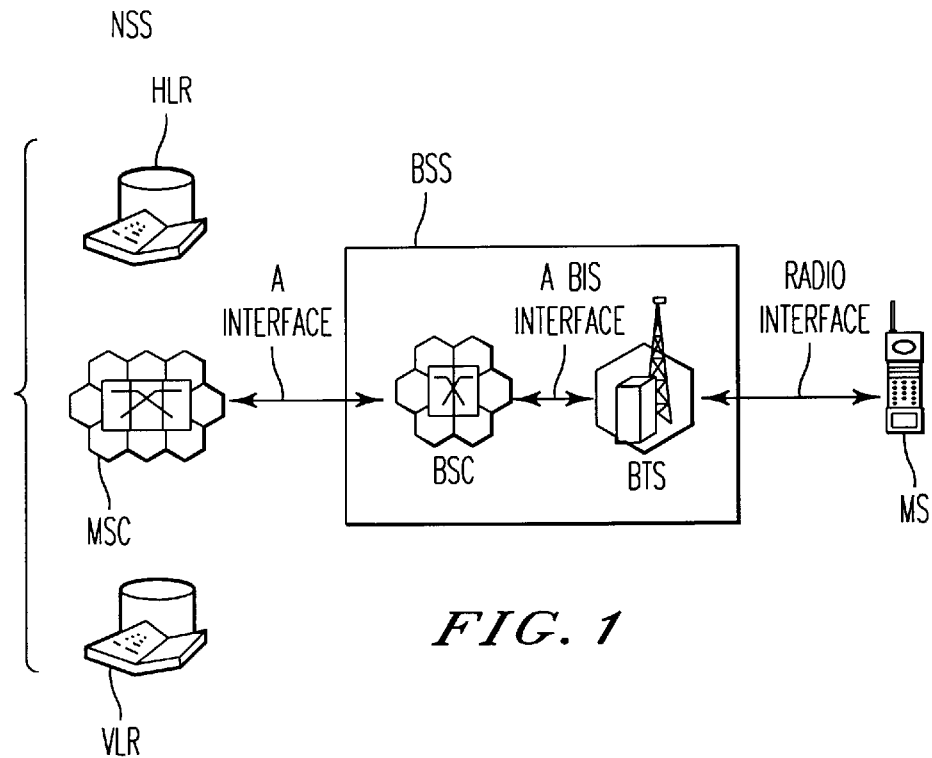
FIG. 1 an example of a known architecture of a GSM system.
Figure 2:
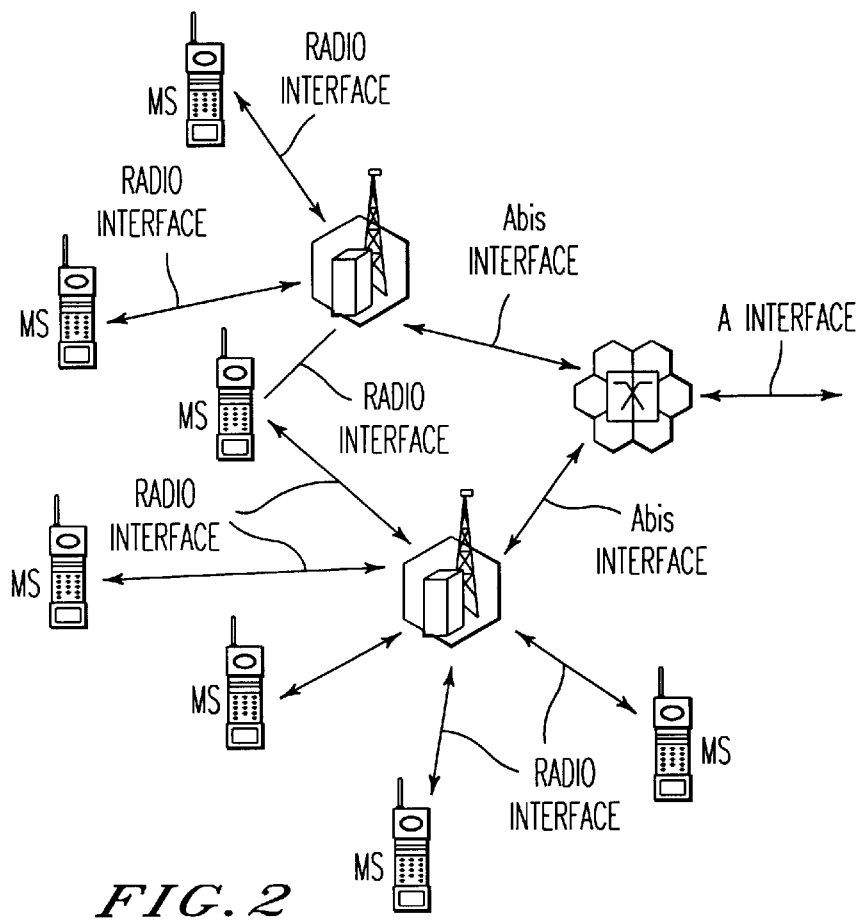
FIG. 2 the structure of a GSM network.

The GSM system architecture which is represented in FIG. 1 makes it possible to cater for digital communications between mobiles and subscribers of the switched public network. For the system to be able to offer these services, a series of functions are necessary. These functions are those required by any network of mobiles. They are in particular the dialling function, the function of routing to a mobile user, the cell transfer function etc. These functions are grouped together in functional entities represented diagrammatically in FIGS. 1 and 2. They are composed of mobile stations MS, radio subsystems BSS and management and routing subsystems NSS. The references MS, BSS and NSS are respectively the abbreviations standing for "Mobile Station", "Base Station System" and "Network and Switching Subsystem".

The term mobile station should be understood to mean an item of physical equipment which is used by a user who is moving through cells of a network. This mobile station allows the user to access the telecommunication services offered. Various types of mobile stations exist, they are differentiated from one another according to whether they are mounted on vehicles or whether they have the form of portable or carriable apparatus.

A radio subsystem is an item of equipment which caters for the coverage of a specified geographical area, called a cell. It contains the hardware and the software necessary for communicating with the mobile stations. In functional terms, a radio subsystem carries out a control function with the aid of a base station controller BSC and a radio transmission function supported by base stations BTS, The names BSC and BTS are the abbreviations standing for "Base Station Controller" and "Base Transceiver Station". The territory of each cell is covered with the aid of a base station. The latter manages the links with the mobile stations MS with the aid of an interface called the "radio interface". The relationships between the base stations BTS and their base station controller are defined by an interface called the "Abis Interface". The base station controllers are linked to the remainder of the network with the aid of an interface called the "A Interface".

A management and routing subsystem NSS is composed of three elements hereinafter referred to as MSC, HLR and VLR. The MSC element is a mobile service switch responsible for routing the communications from and to the mobiles in a cell. The HLR element is a database wherein are recorded the permanent parameters of a subscriber; it moreover contains for each mobile an item of information making it possible to locate it. This information is updated continuously. The VLR element is a database wherein is recorded a fine pinpointing of the mobile in a call area.

The structure of the network is cellular, its capacity is obtained by meshing the territory with the aid of cells each served by a base station.

Figure 3:
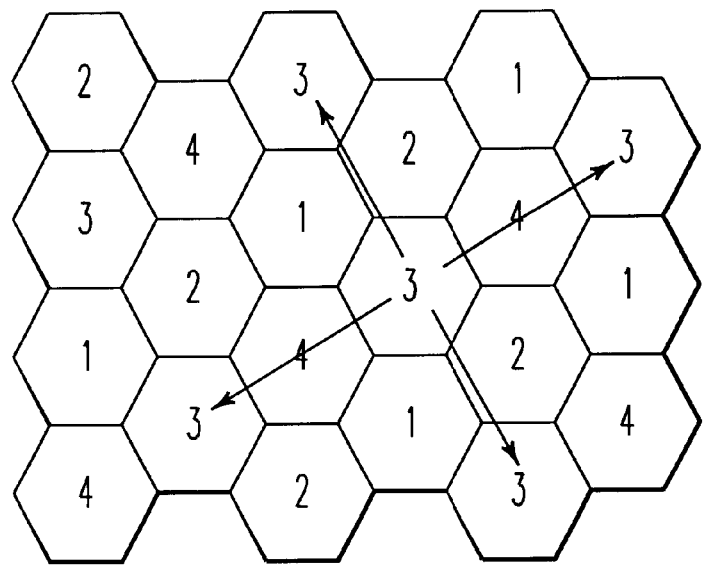
FIG. 3 a mode of reusing frequencies.

An important characteristic of a GSM network is the reuse of frequencies across the network. The number of juxtaposed cells using the same frequencies is indicated by a reuse pattern. The illustrative scheduling of the cellular network of FIG. 3 is that of a network in which the reuse pattern has a size of 4. It is noted that the frequency of cell No. 3 is reused at a low distance and that interference may arise between the cells.

Figure 4:
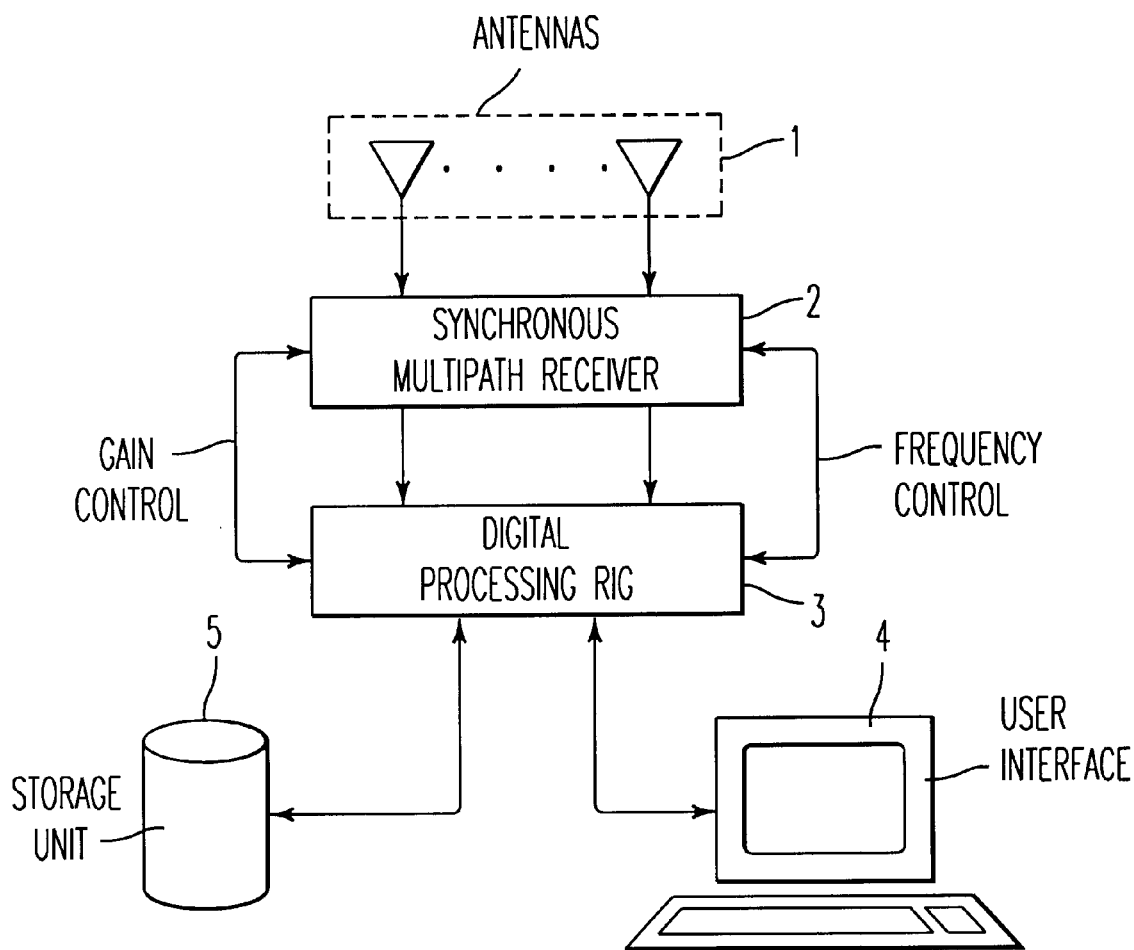
FIG. 4 a functional embodiment of a device for analysing interference according to the invention, FIGS. 5 and 6 modes of siting networks of antennas of the device represented in FIG. 4, FIG. 7 an algorithm for identifying base stations in the form of a flow chart, FIG. 8 formats of bursts of FCH, SCH data, and of traffic of the GSM system, FIG. 9 the structure of the multi-frame 51 of the beacon frequency of the GSM system, FIG. 10, the mode of coding a first identification level transmitted on the SCH type bursts of the GSM system, FIG. 11, the mode of coding a second identification level-making it possible to identify the identity of the cell which is transmitted by a base station on the beacon frequency with the aid of the BCCH bursts, FIG. 12, an example of cross-correlation results performed on the reference sequences of the traffic bursts of the GSM system in respect of the sorting of the TCH bursts, FIG. 13, an illustration of a case of false alarm produced by the secondary peaks obtained as a result of the cross-correlation of the reference sequences, FIG. 14, a representation in the form of a flow chart of a main algorithm for sorting the TCH bursts so as to eliminate false alarms, FIG. 15, an algorithm for the preliminary sorting of the TCH bursts in the form of a flow chart, FIG. 16, a graph of spatial diversity obtained at the output of the sensors of the antenna system of the device of FIG. 4, FIG. 17, a simplified basic diagram of a demodulator employed for the construction of a device according to the invention, FIG. 18, a diagram to illustrate the principle of operation of a spatial filtering implemented in the device according to the invention, FIGS. 19 and 20 charts showing anti-jamming performance which may be obtained by implementing the process according to the invention, FIG. 21 an equalizer structure which can be implemented for the construction of the device according to the invention, FIG. 22 a diagram illustrating the testing of the ambiguities of synchronization between TSC sequences, FIG. 23 a second functional embodiment of a device for analysing interference according to the invention.

The device according to the invention, which is represented in FIG. 4 makes it possible to identify in a cell the interference caused by neighbouring cells. This device comprises a network of antennas 1 which is coupled to a multipath receiver 2 allowing the synchronous reception of the signals received by each of the antennas. A digital processing rig 3 coupled to the multipath receiver 2 makes it possible to perform the digitizing of the signals provided by the receiver 2 and to cater by way of a console 4 for the interface with a user. A storage interface 5 coupled to the digital processing rig 3 caters for the storage of the elements detected.

The digital processing rig 3 detects the type of frequency channel on which the reception system is positioned and carries out a classification between beacon and traffic frequencies. It determines, on a beacon-type channel, the identification word BSIC which is the abbreviation standing for "Base Station Identification Colour" of each cell "best server" and of the interfering cells, which is obtained after demodulating SCH bursts as well as the identity CI of each cell and its locating code LAC, after demodulating BCCH bursts. Lastly, on a traffic type channel, it determines the list of TSC reference sequences detected on the channel, as well as the associated reception levels, searches for a beacon frequency synchronous with the traffic frequency and demodulates it so as to provide the list of associated traffic frequencies; should there be agreement between the detected list and the detected traffic frequency, the beacon frequency is decoded to provide the identity CI, and the locating code LAC. The synchronism between beacon frequency and traffic frequency corresponds to a temporal agreement in the transmission of the bursts on the two frequencies.

Figure 5:
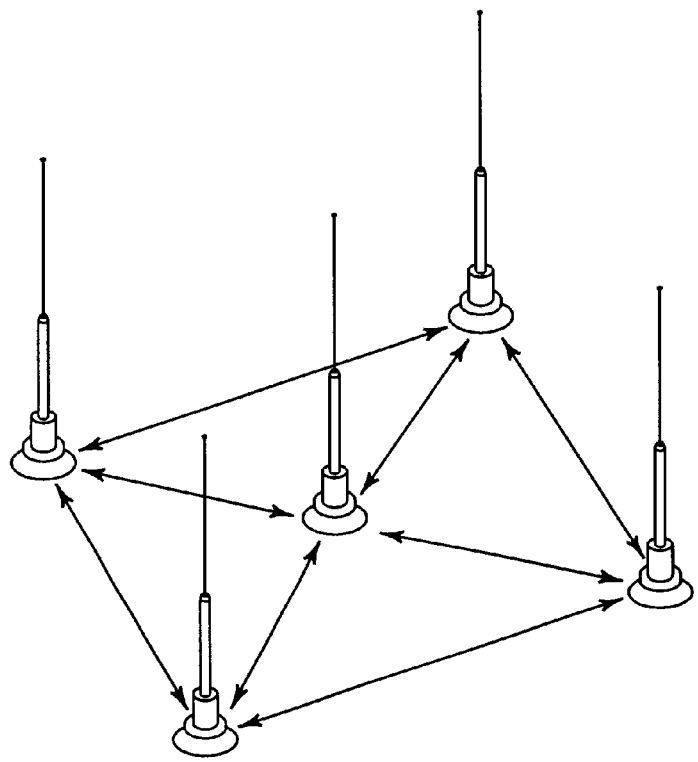
Figure 6:
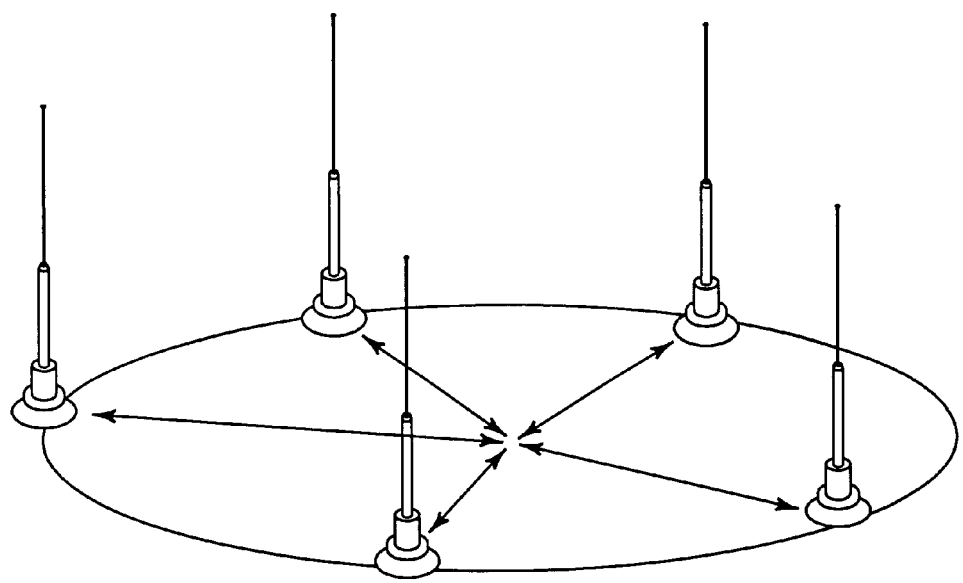

The network of antennas 1 can consist by way of example of antennas known by the name GSM/DCS1800 arranged on the roof of a vehicle while ensuring that the separation between each element is at least equal to 0.5 times the largest wavelength used so as to obtain, for each transmission, independent fading states on each sensor. The geometrical layout is unimportant and the number of antennas employed may be variable, however the number 5 corresponds to a good balance between performance and complexity of processing. Examples of the siting of antennas are shown in FIGS. 5 and 6.

In order to offer flexibility of use and of exploitation, the functions of the device may be supplemented with a GPS type positioning function so as to correlate the jamming hypotheses with the scheduling of the network and the place of the measurement, and a teleoperation and telemetry function so as to have an autonomous rig at the place of the measurement.

Figure 7:
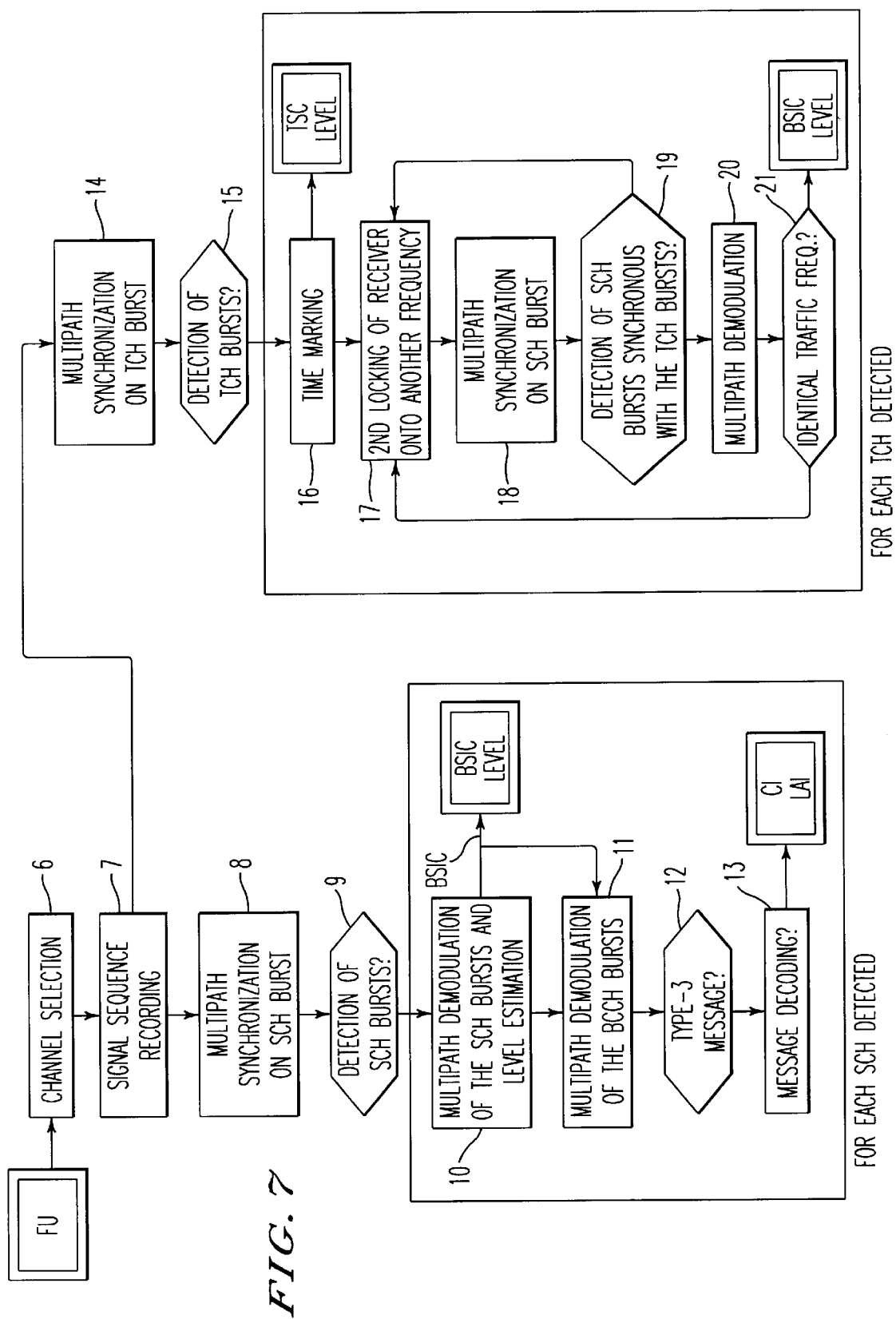

The identification of the base stations implicated by an interference phenomenon takes place according to steps 6 to 21 of the process represented in the flow chart of FIG. 7, This process makes it possible, for each channel selected on the one hand, to search for the base stations using this channel as beacon frequency, with a decoding of the type-3 messages so as to obtain the cell's identity CI and its locating code LAC and on the other hand, to search for the base stations using this channel as traffic frequency, as well as to search for the associated beacon frequency by identifying the latter by virtue of the synchronism of the burst transmitted on the beacon and traffic frequencies by one and the same base station.

This identification is effected by taking account of the specific features of the GSM system, namely that it provides for two types of use of the frequency channels associated with each base station, a beacon frequency channel and traffic frequency channels.

The beacon frequency channel (one per station) allows the base station to broadcast to mobiles served by the cell a number of items of signalling information which are not dedicated to a communication or to a mobile. It also serves as frequency reference for the mobiles and is transmitted at a constant level even if it is not carrying traffic information since a transmission at a constant level allows the mobiles to perform fast identification. It also conveys specific bursts (SCH bursts) allowing temporal synchronization and the identification of the reference sequences (TSC) which are used for the signalling bursts.

The traffic frequency channels are all the other frequency channels used, they convey mainly traffic bursts (TCH bursts) and have energy only when a communication is conveyed on the TCH bursts.

Figure 8:
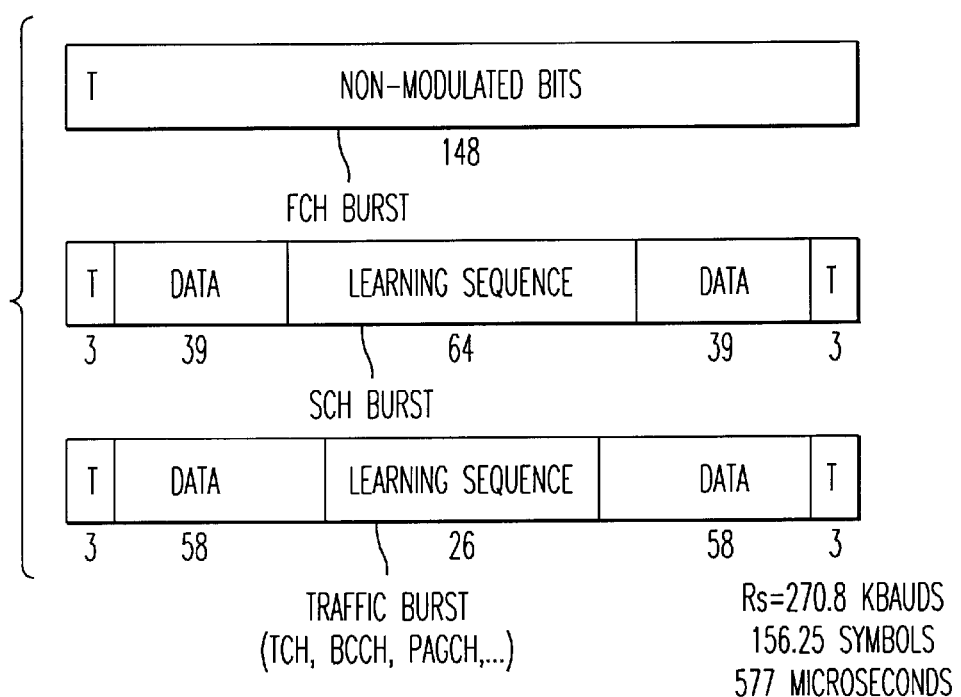
Figure 9:
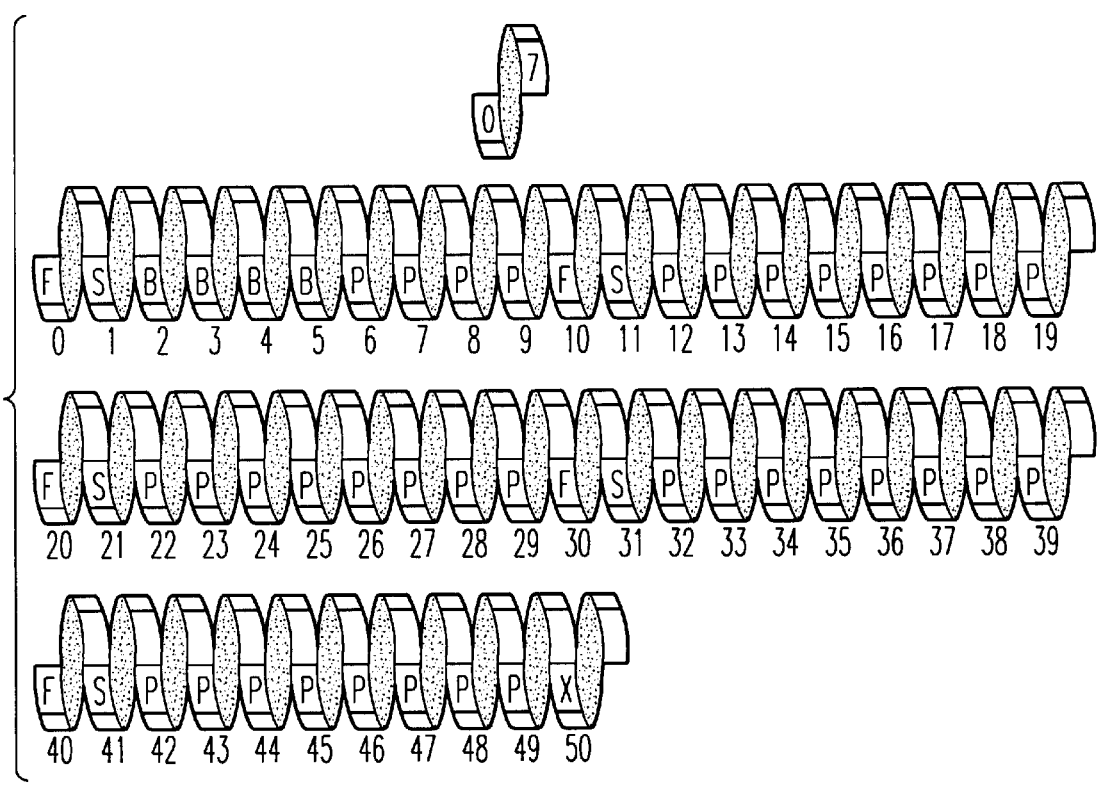

According to the flow chart of FIG. 7, when the device is positioned in step 6 on a frequency which it is to analyse, its first task is to identify the types of frequency channel with which it is confronted. If a beacon channel is present on the channel analysed, identification is easy and is made on the identifier CI of the transmitting cell whereas in the case of a traffic channel this identifier does not exist except by dint of the TSC sequence used. To do this, in step 8 the device performs a multipath SCH burst synchronization on a reference sequence 64 bits long as indicated in FIG. 8. This sequence has sufficient autocorrelation performance to make it possible easily to identify interference situations signalled by several synchronization peaks. These bursts are present on the time interval TN0 of the multiframe 51 of the beacon frequency, as indicated in FIG. 9. Also represented in this figure by their first letter are the locations of the FCH, BCCH and PAGCH bursts. The FCH bursts labelled by the letter F are non-modulated bursts which correspond to a carrier and which allow the mobiles to perform fast detection of the beacon frequencies. The BCCH bursts labelled by the letter B are general signalling bursts, destined for all the mobiles which transport the signalling and which contain the cell identification (CI) and locating (LAC) information. The PAGCCH bursts labelled by the letter P are bursts of calls by mobiles. These last two types of bursts are like the TCH bursts of the traffic bursts which convey the phone signals.

Figure 10:
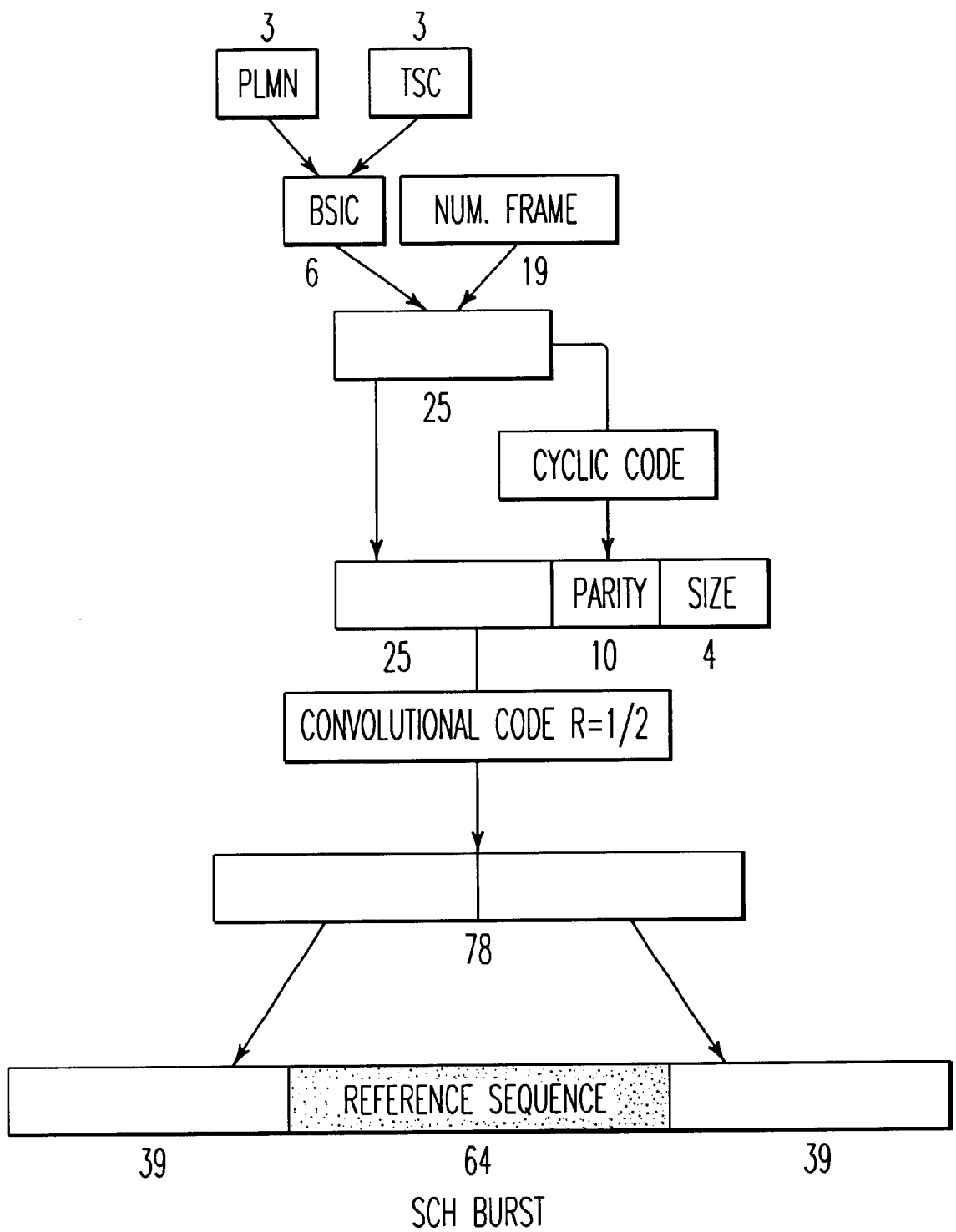

The process continues in step 10 of the flow chart of FIG. 7 by performing a multipath demodulation of the SCH bursts labelled in FIG. 9 by the letter S, so as to extract the station identification code BSIC. The BSIC code contains two items of information. A first item indicates the number PLMN of the network and a second item indicates the reference sequence TSC which will be used by the base station on the signalling bursts. This second item is coded in the manner represented in FIG. 10. The coding implements a cyclic code for generating an error correcting code CRC as well as a convolutional code for improving the demodulation performance. The benefit of decoding the BSIC code is that it allows identification of the base stations involved. Consultation of a scheduling database then makes it possible to isolate the stations exhibiting the same transmissions of beacon frequency and the same BSIC code.

Figure 11:
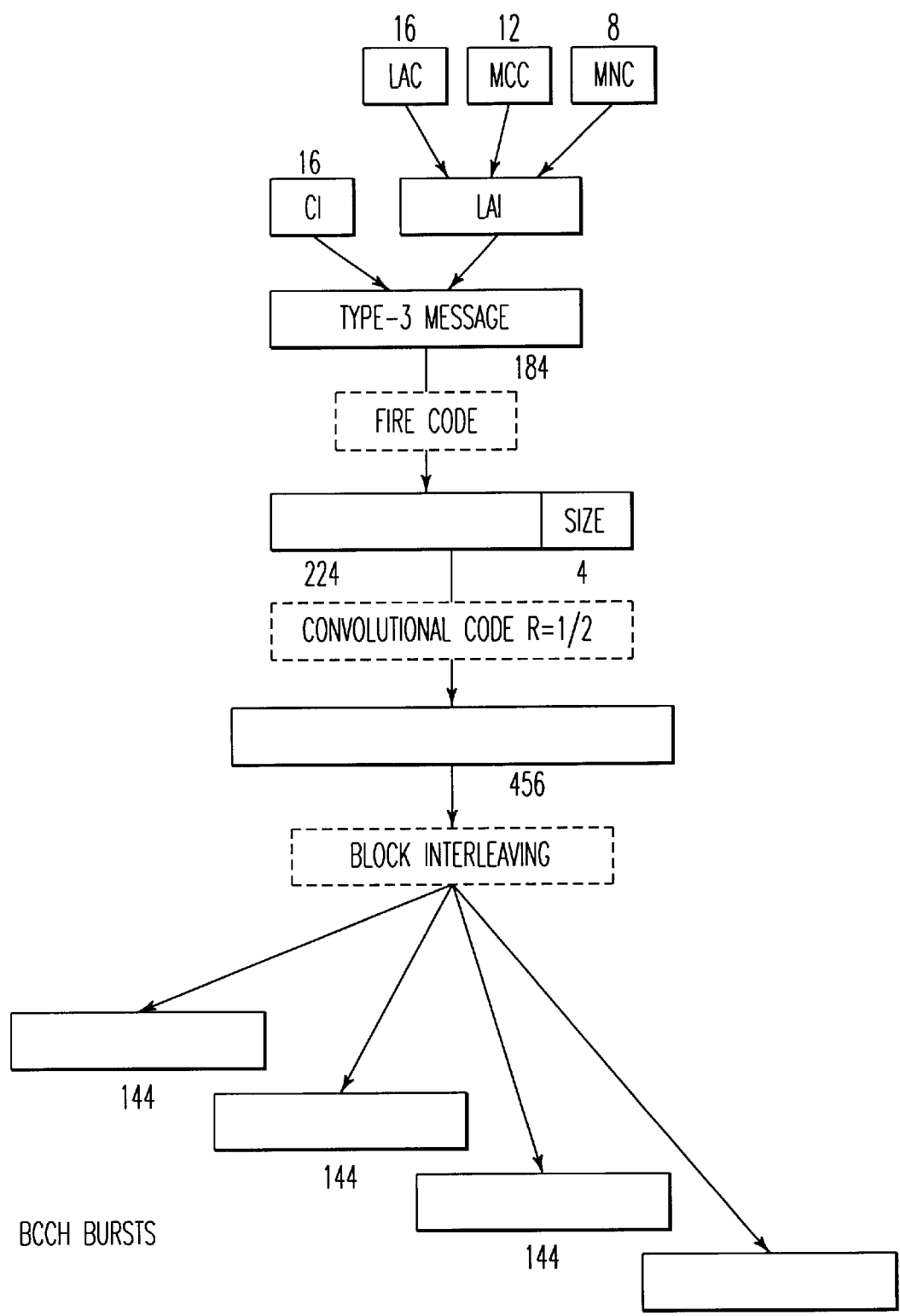

A second type of information item which makes it possible to identify the stations involved is the item CI which is the abbreviation standing for "Cell Identity". This item is transmitted by the base stations on the beacon frequency with the aid of the BCCH bursts. The purpose of these bursts is to convey system signalling messages, in particular the type-3 message which contains the CI and LAI identification information, LAI being the abbreviation standing for "Location Area Identification" which makes it possible to identify a grouping of cells in which a call is broadcast. The type-3 message is transmitted cyclically on the beacon frequency at the rate of twice per cycle of two seconds. This allows the device the possibility of storing at least one second of signal and of thus employing at least one recurrence of the type-3 message. The CI and LAI information is coded according to the diagram of FIG. 11 This coding consists in distributing the message over the 4 BCCH bursts of the multiframe 51 on the basis of a block interleaving resulting from a convolutional coding of the type-3 message to which is appended an error correcting code CRC.

The identification of the reference sequences used on the channels is effected by executing steps 14 to 16 of the flow chart of FIG. 7. Steps 14 and 15 are preliminary steps which consist in firstly performing, in step 14, a multipath synchronization on the TCH bursts before performing their detection in step 15. Only three types of burst waveforms represented in FIG. 8 are used. They relate to the FCH bursts, the SCH bursts and the traffic bursts. All the BCCH, PAGCH bursts, etc. are in fact bursts having the same physical structure as the TCH bursts and consisting of a sequence of 26 symbols flanked by two data areas of 58 useful symbols. In fact the GSM standard provides for the use of 8 different reference sequences known also as TSC "Training Sequence Code" which allow a separation of communications using the same frequency. Accordingly, the multipath synchronization of step 14 is effected by performing in succession a test of each of the possible sequences and by providing the position of the bursts detected as well as the sequences detected.

The purpose of steps 16 to 21 of FIG. 7 is to identify the base station transmitting the disturbing traffic frequency. To do this, in step 16 the process performs a time marking of the arrival of the disturbing traffic bursts, and positions the system on another frequency in step 17. On this frequency, in step 18 it will search for the SCH bursts which comply with a TDMA rate consistent with that indicated by the time marking of step 16. Step 19 makes it possible to perform the detection: if it finds an SCH burst which complies with the TDMA rate, then the process goes to step 20, otherwise it returns to step 17 to change frequency. Step 20 makes it possible to carry out the demodulation of the beacon frequency synchronous with the traffic frequency and to provide from among the signalling messages the list of traffic frequencies used by the cell which possesses this beacon frequency. Step 21 makes it possible to compare this list with the jamming traffic frequency. In the event of agreement, the jamming cell is found and the process provides its identification CI and its BSIC code, by decoding the SCH bursts of the beacon frequency.

Figure 23:
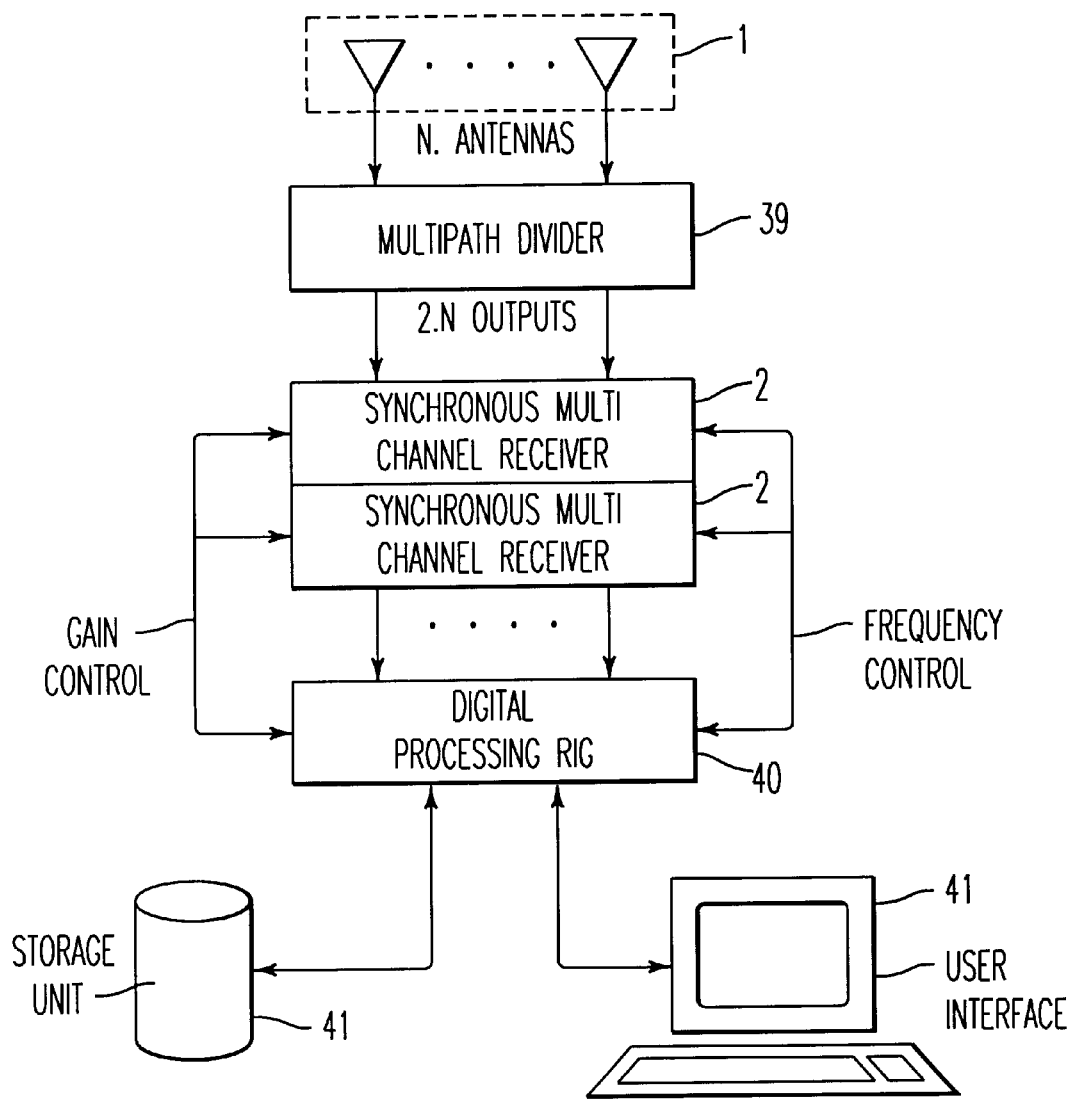

In order to facilitate the time marking of the arrival of the jamming traffic bursts and to avoid overly large clock drifting, it is possible to use a structure of device such as represented in FIG. 23, wherein is found:

the same network of antennas 1 as in FIG. 4, a divider 39 (N to 2N) which makes it possible to divide the signal received on each antenna, two receivers 2 which are positioned, one on the jamming frequency and the other which searches for the associated beacon frequency, a digital rig 40 makes it possible to digitize twice as many signals as the rig 3 of FIG. 3 and which makes it possible to perform a search for TCH bursts continuously on the signal received by the first receiver and a search for SCH bursts, which is synchronous in the TDMA sense, on the signal received by the second receiver; the TDMA synchronism comparison is performed in the rig 40 and presented to the user with the aid of an interface 41.

In order to avoid the use of the divider 39, it is possible quite simply to use twice as many antennas to form a network with 2N antennas.

Figure 12:
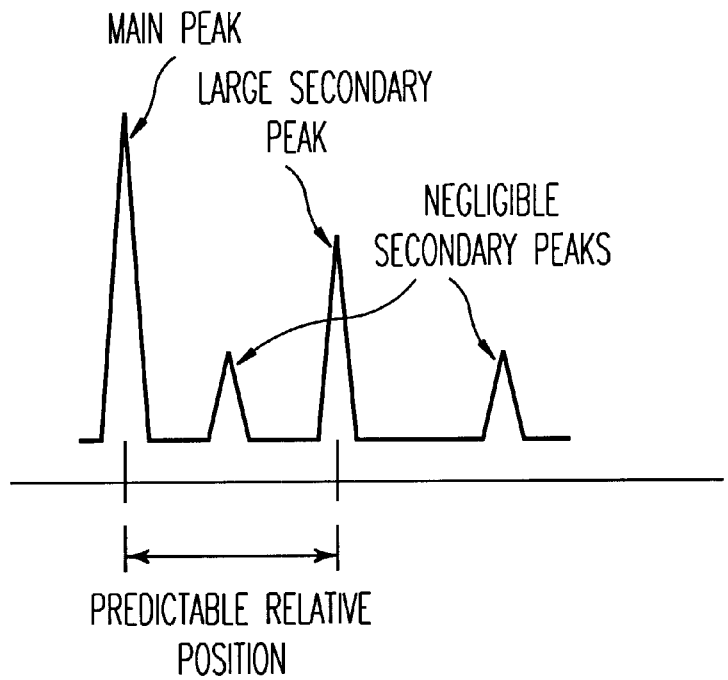
Figure 13:
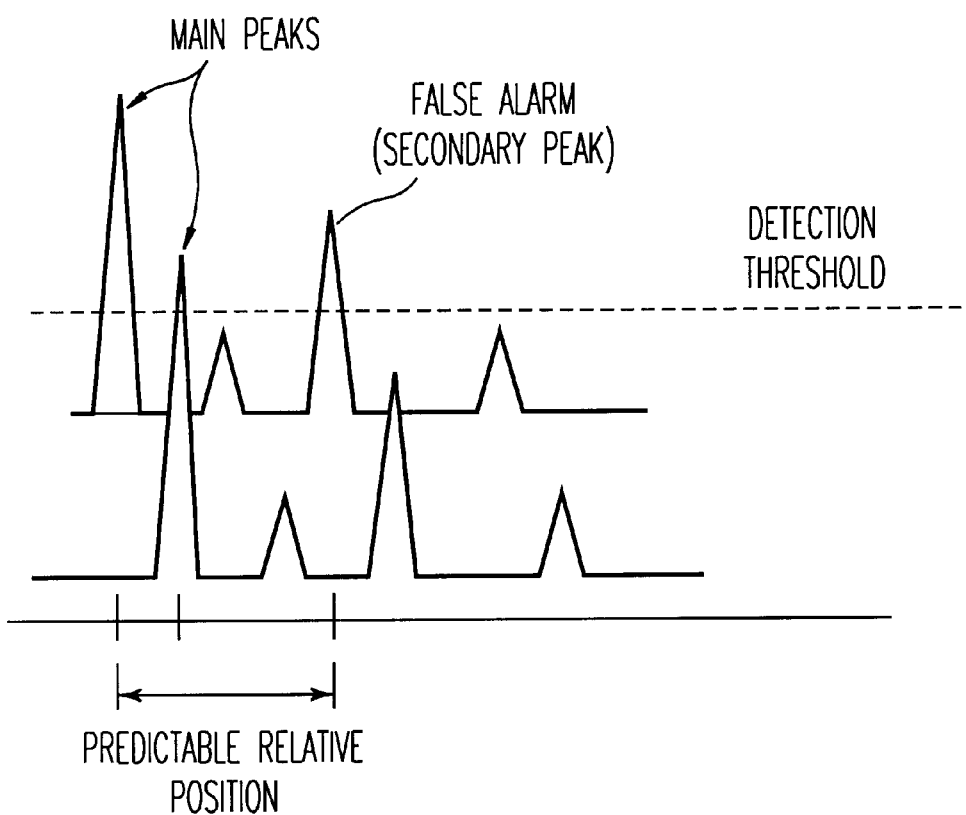

Since the GSM standard provides for the use of 8 possible reference sequences for the traffic bursts whose length is just 26 symbols, performance is therefore limited as regards the cross-correlation between the sequences, this cross-correlation exhibiting, as shown in FIG. 12, secondary peaks of large levels between the various sequences. Given the large variations in dynamic range when receiving the signals, these secondary peaks are the cause, as shown by FIG. 13, of false alarms in the multipath processing. This false alarm level is limited by using a sorting algorithm which runs according to steps 22 to 34 of the flow chart of FIG. 14.

This algorithm takes into account the prediction which may be performed on the position of the secondary peaks and on their level. The processing begins in step 22 with detection of the TCH bursts, followed in step 23 by a sorting of the bursts detected by sorting them into a list in descending order of their estimated signal-to-noise ratio SNIR. During step 22 the labelling of the position of the reference sequences is performed and the SNIR corresponding to each position is estimated.

Step 24 makes it possible to initialize the filtering procedure by positioning a pointer N on the first position in the list.

Step 25 is intended for selecting the current TSC, the current SNIR and the current position of the element selected from the list by the pointer N. Step 26 makes it possible to position a second pointer K on the same position as the first pointer. Step 27 makes it possible to move the second pointer K onto the next position in the list.

Step 28 makes it possible to address an ambiguity table with, as input, the TSCs used by the list elements pointed at by the two pointers N and K. This table determines the possible list of timewise ambiguity discrepancies for the two TSCs selected, as well as for each ambiguity discrepancy the associated SNIR.

Figure 22:
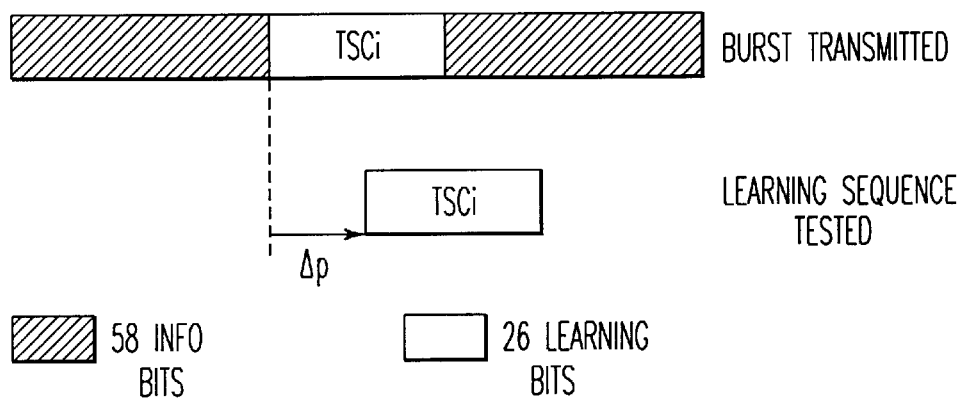

This list can be determined by simulations in the following way: the signal transmitted is composed of a string of GSM bursts formed of two sequences of 58 random information bits, these sequences being arranged alternately either side of each of the eight learning sequences $TSC_i$ (i=0, . . . , 7) defined in the standard. For each of the eight learning sequences $TSC_i$, a large number of bursts are transmitted, and the synchronization criterion corresponding to each of the eight sequences $TSC_j$ (j=0 . . . , 7) is calculated for the synchronization positions Applying between −35 (i.e −16 bits) and +35 (i.e. +16 bits) as shown in FIG. 22. For each of the pairs (i: sequence transmitted, j: sequence tested), the positions Δp for which the threshold has been exceeded at least once are noted. The following are calculated for these positions: the mean value of the synchronization criterion when the threshold is exceeded, and the percentage of cases in which the threshold has been exceeded. The results are stored in the table of ambiguities, utilized by the sort algorithm, which takes account of these values to decide whether a sequence $TSC_i$ detected in a position p should not be retained since in reality it corresponds to a sequence $TSC_j$ transmitted in the position p+Δp, Step 29 compares the discrepancy measured for the two elements of the list with the list of possible timewise ambiguity discrepancies for the TSCs. If there is agreement, the process continues in step 30, otherwise it passes to the execution of step 27 so as to position the second pointer K on the next element of the list, Step 30 is optional. It performs a coarse comparison between the SNIRs of the ambiguity table and those detected. If there is agreement, the process continues in step 31, if not it returns to step 27 so as to position the second pointer K on another element of the list.

Step 31 makes it possible to eliminate the element pointed at by K.

Step 32 checks whether there are still elements in the list to be run through by the pointer K and if so the process returns to step 27 to increment the pointer K. Otherwise it continues to step 33 to increment the pointer N.

Step 34 completes the procedure by checking whether there are still elements in the list so as to increment the pointer N. If so, the process then returns to step 25. Otherwise the procedure is terminated.

This algorithm can however be optimized, in the case of traffic type jamming on a beacon frequency. Indeed, in this case the positions of the traffic bursts on the beacon frequency are known from the positions of the SCH bursts. The positions of the TCH bursts of a beacon frequency being known perfectly, they need not be filtered by the sort algorithm. This is what is represented in the flow chart of FIG. 15, where the positions corresponding to these bursts are positioned at the head of the list and are not disputed in the filtering.

The processing begins in step 35 with the labelling of the SCH bursts, the determination of the BSIC (which provides the TSC sequence of the BCCH bursts), and the determination of the corresponding signal-to-noise ratio SNIR. A list of M positions which are not disputed is thus constructed.

Figure 14:
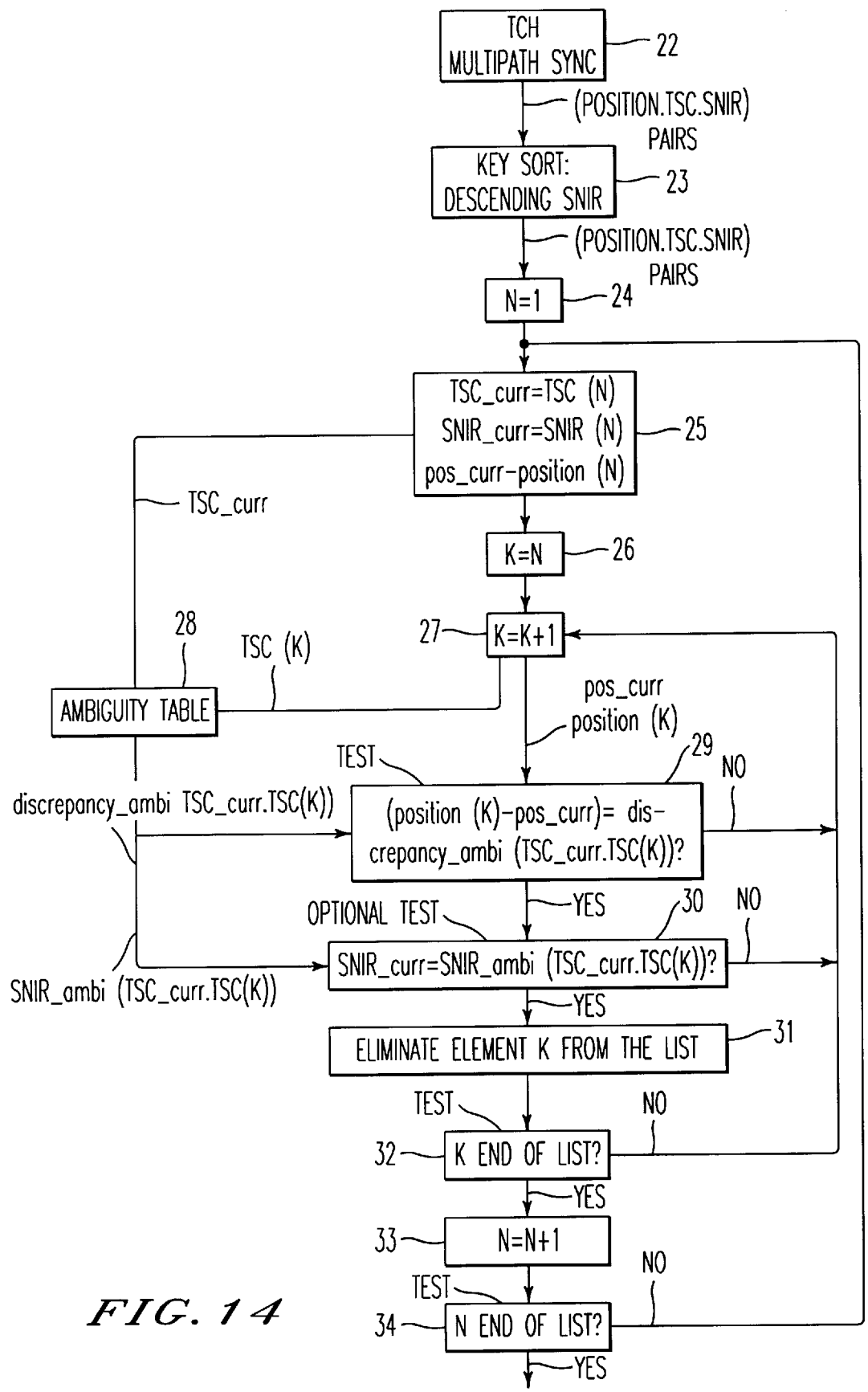

Steps 22 and 23, which are identical with those of FIG. 14, are conducted in parallel and provide another list. These two lists are appended during step 37, taking care to place the M previous elements at the head of the list, and to eliminate redundancies.

Figure 15:
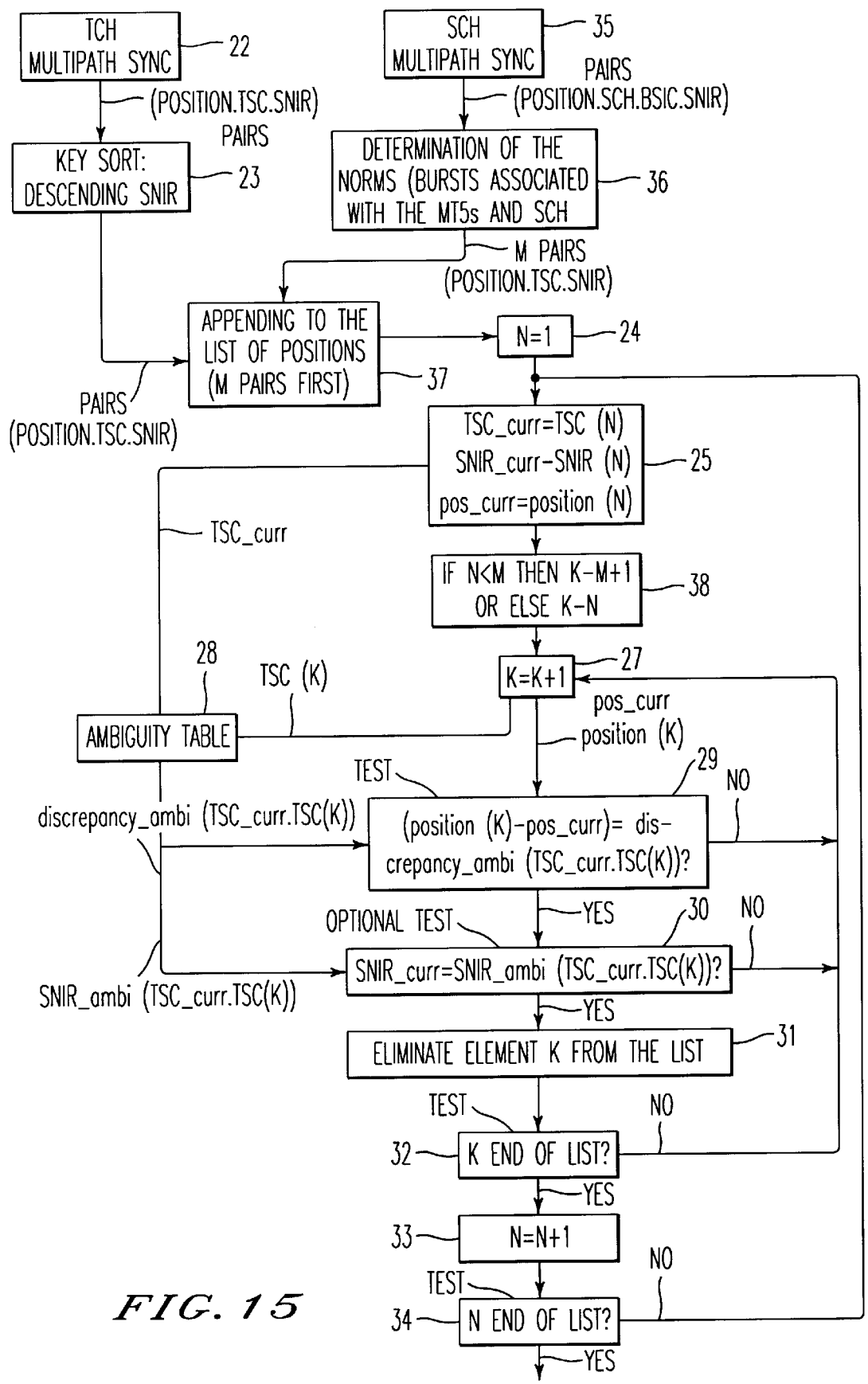
Figure 16:
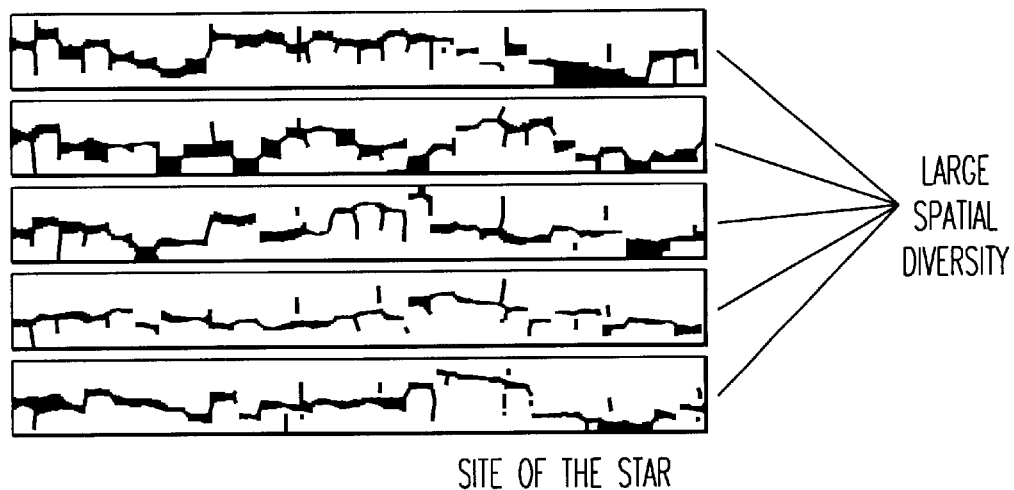

The filtering processing can then start, as specified in FIG. 15. This processing is identical to that of FIG. 14, except for step 38 which does not make it possible to position the pointer K at the top of the list (only after the Mth element of the list).

In order to reduce the number of comparisons to be made in the sort algorithm, the synchronization positions for each TSC can be grouped together by equivalence class modulo 8 I.T. (that is to say modulo a time interval equal to 8*15625*48/13 µs, corresponding to the GSM frame rate). Each equivalence class thus represents a synchronization position less than the number of samples contained in 8 I.T.s, and the associated number of synchronization positions, as well as the mean SNIR (mean of the SNIRs estimated for each element of the class), is indicated for each class. The sort algorithm can then be implemented in the manner described above, using the synchronization positions of each of the equivalence classes thus defined. Two additional constraints may be used to optimize the sort algorithm:

- The percentage of cases in which the threshold is exceeded, stored in the ambiguity table, may be used: to eliminate element K from the list, the ratio of the number of elements in the equivalence class associated with position (K) to the number of elements in the equivalence class associated with the current position should be of the same order of magnitude as the percentage of cases in which the threshold is exceeded.
- A pre-sort may be performed by eliminating the equivalence classes which are insufficiently filled in accordance with a threshold dependent on the maximum number of elements in each equivalence class and on the minimum percentage occupancy so as to decide whether a TCH channel corresponding to an equivalence class is active: a TCH channel which is active 1% of the time for example is very likely to correspond to a false alarm and the corresponding equivalence class is eliminated.

Figure 17:
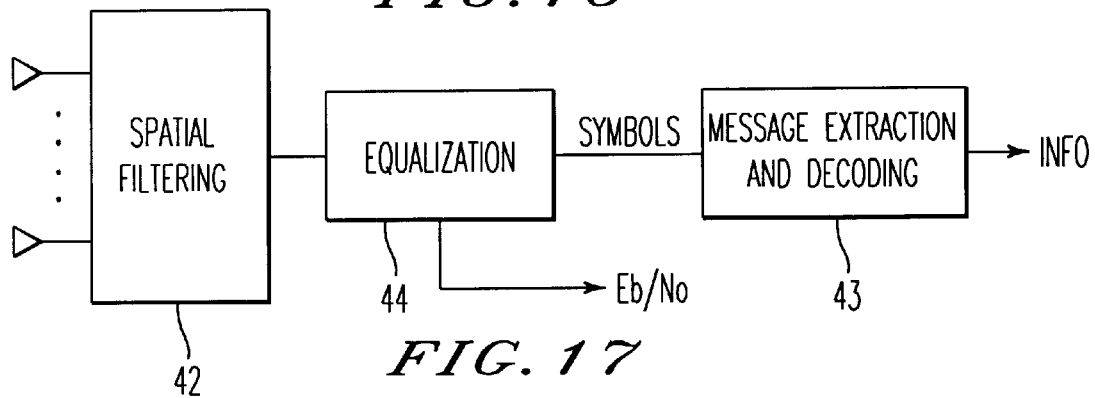

A device for implementing the process is represented in FIG. 17. It comprises a spatial filtering device 42 coupled to a decoding and message extraction device 43. The execution of the first step of the process which consists in detecting the presence of SCH bursts on a beacon channel, or the presence of TCH bursts on a traffic channel can be implemented according to the synchronization technique described in patent application Ser. No. 2715488 filed in the name of the Applicant and entitled "Procédé et dispositif permettant à un modem de se synchroniser sur un transmetteur de donnees numériques par voie hertzienne en présence de brouilleurs [Process and device allowing a modem to synchronize with a radio digital data transmitter in the presence of jammers]." This technique allows a modem to synchronize itself with the aid of learning sequences inserted into the waveform. It consists in estimating the correlation matrix $\hat{R}_{XX}$ of the signals received on N sensors of the network of antennas, in calculating the inverse correlation matrix $\hat{R}_{XX}$, in calculating cross-correlation vectors $\hat{r}_{Xd}$ between the signals X(k) received on the set of N sensors and a known learning or reference signal for calculating a multisensor synchronization criterion. Applied to the invention this technique makes it possible to detect the presence of an SCH of TCH type burst on a signal sample p as a function of the value of a multipath synchronization criterion C(p) defined by the relations:

$$C(p) = \frac{\hat{r}_{Xd}(p)^+ \cdot \hat{R}_{XX}^{-1}(p) \cdot \hat{r}_{Xd}(p)}{\frac{1}{N} \cdot \sum_{n=0}^{N} |d(n)|^2}$$

with:

$$\hat{r}_{Xd}(p) = \frac{1}{N} \cdot \sum_{n=0}^{N} X(n+p) \cdot d^*(n)$$

$$\hat{R}_{XX}(p) = \frac{1}{N} \cdot \sum_{n=0}^{N} X(n+p) \cdot (X(n+p))^+$$

Synchronization is placed at the instant of appearance of a signal sample (p) when the value C(p) of the criterion is greater than a specified threshold value η. For each detected synchronization position, the SNIR of the corresponding path can be estimated through the formula:

$$SNIR = \frac{C(p)}{1 - C(p)}$$

This SNIR is used during step 30 of the algorithm for sorting the TCH bursts.

The implementation of the multipath synchronization therefore requires, for each position p tested, the calculation of $\hat{r}_{Xd}(p)$ of $\hat{R}_{XX}(p)$ of the inverse of $\hat{R}_{XX}(p)$ and of the criterion $\hat{r}_{Xd}(p)^+ \cdot \hat{R}_{XX}^{-1}(p) \cdot \hat{r}_{Xd}(p)$.

In order to limit the computational power for the multipath synchronization, the matrix $\hat{R}_{XX}(p)$ is computed and inverted every P positions, that is to say for the positions $p_0$ such that p modulo P is zero, by performing the correlation on N+P samples:

$$\hat{R}_{XX}(p_0) = \frac{1}{(N+P)} \cdot \sum_{n=0}^{N+P} X(n+p_0) \cdot (X(n+p_0))^+$$

On the P positions following the position $p_0$, the criterion C(p) is computed using $\hat{R}_{XX}^{-1}(p_0)$ the computation of $\hat{r}_{Xd}(p)$ remaining unchanged.

In the above relations d(n), n=0, . . . , L, denotes the complex signal corresponding to the learning sequence for the SCH or TCH signals, this complex signal being sampled at a frequency Fe, and X(n),n=0, . . . , N, denotes the multisensor signal received at the input of the temporal filter 21, sampled at the frequency Fe.

The synchronization positions detected provide the starting information required for the demodulation. In FIG. 17 the demodulation is achieved in two steps, a step of spatial filtering by the device 42 and a step of single-path equalization by the device 44. The spatial filtering makes it possible on the one hand to eliminate the interference present on one and the same channel or on an adjacent channel and on the other hand to obtain a diversity gain which is obtained by spacing the sensors sufficiently far apart such that they receive independent fading states. The spatial filtering can be implemented either by using a known method of spatial filtering by simple replica (FAS-R) which leads to the separation of the various multipaths associated with a given transmission, or by using a spatial method of filtering by filtered replica (FAS-RF) which enables all of these multipaths to be taken into account.

The spatial filtering and the equalization are implemented in the invention by exploiting the SCH learning sequences for the demodulation of the SCH bursts or the TSC learning sequences for the demodulation of the BCCH bursts.

The spatial method of filtering by replica is known to the person skilled in the art and reference may usefully be made to the article entitled "Adaptive antenna systems" authored by B. WIDROW, P. E. MANTEY, L. J. GRIFFITHS, A. B. GOODE, published in Pro. IEEE, Vol 57, No. 2, pp 2143–2159, December 1967.

The method of spatial filtering by filtered replica is described in patent application Ser. No. 2742619 filed in the name of the Applicant and entitled: "Procédé d'égalisation multicapteur permettant une reception multicapteur en presence d'interférences et de multitrajets de propagation, et récepteur pour sa mise en oeuvre [Process of multisensor equalization allowing multisensor reception in the presence of interference and of propagation multipaths, and receiver for the implementation thereof]" with inventors Franqois PIPON, Pierre VILA and Didier PIREZ.

Figure 18:
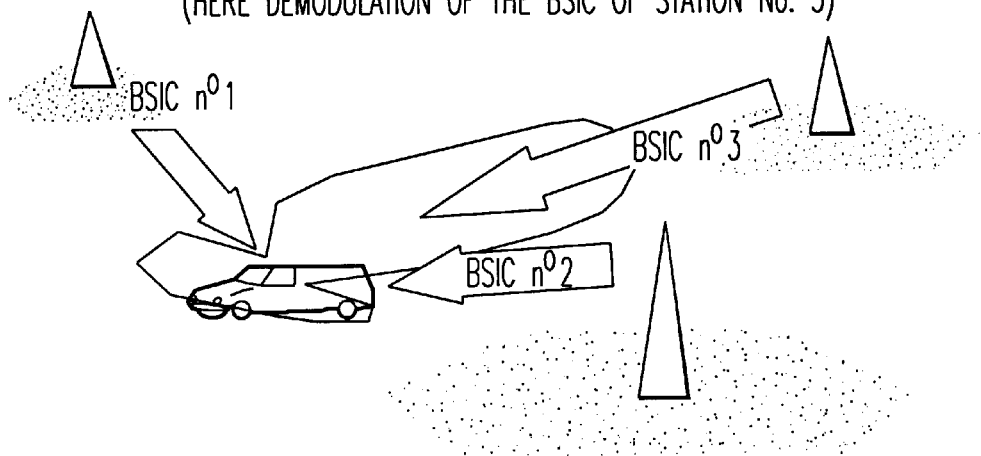
Figure 19:
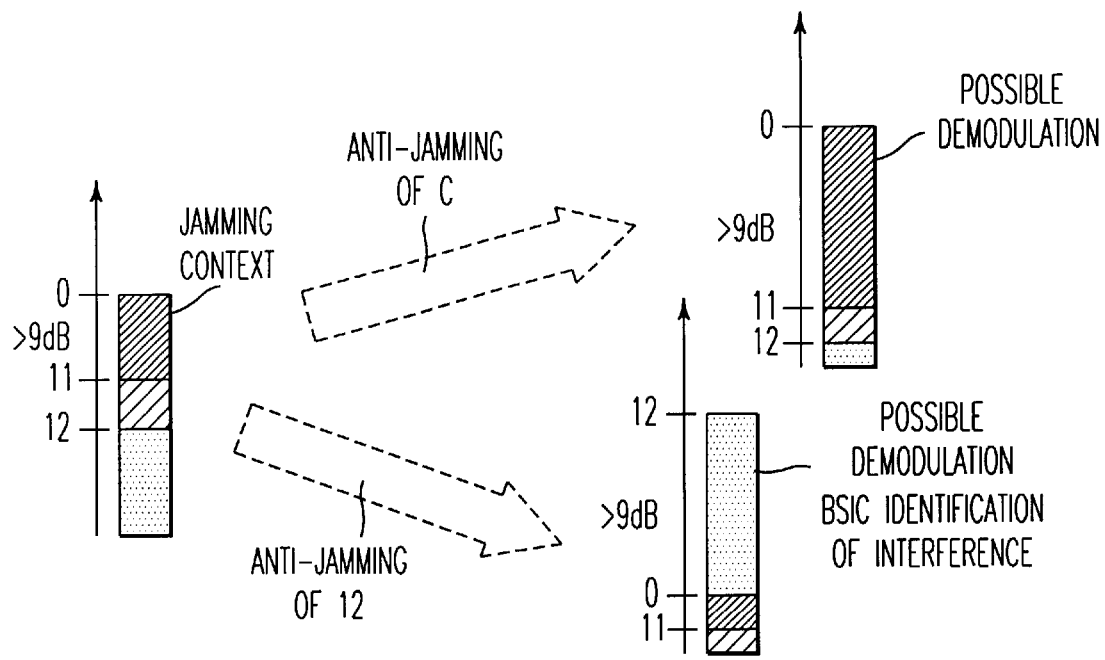
Figure 20:
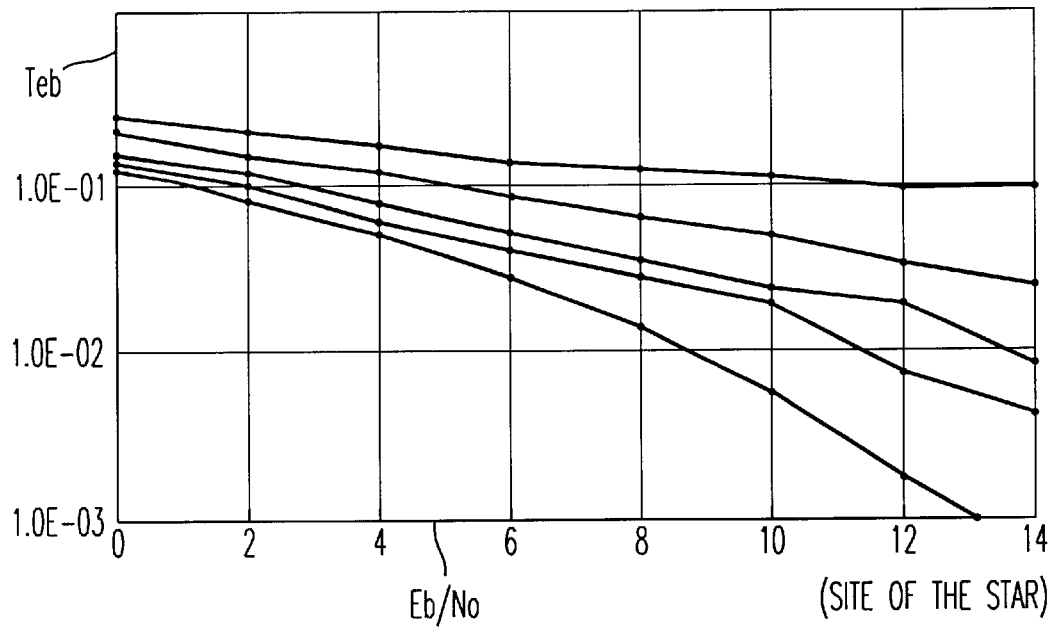

As shown in FIG. 18 the application of a spatial filter to the signals received on the antennas makes it possible to modify the reception diagram of the system and hence to separate the various signals received by forming reception holes in the direction of interfering signals so as to make it possible to demodulate and identify the signal transmitted by a given base station. One type of improvement which may be obtained is represented in FIGS. 19 and 20.

Figure 21:
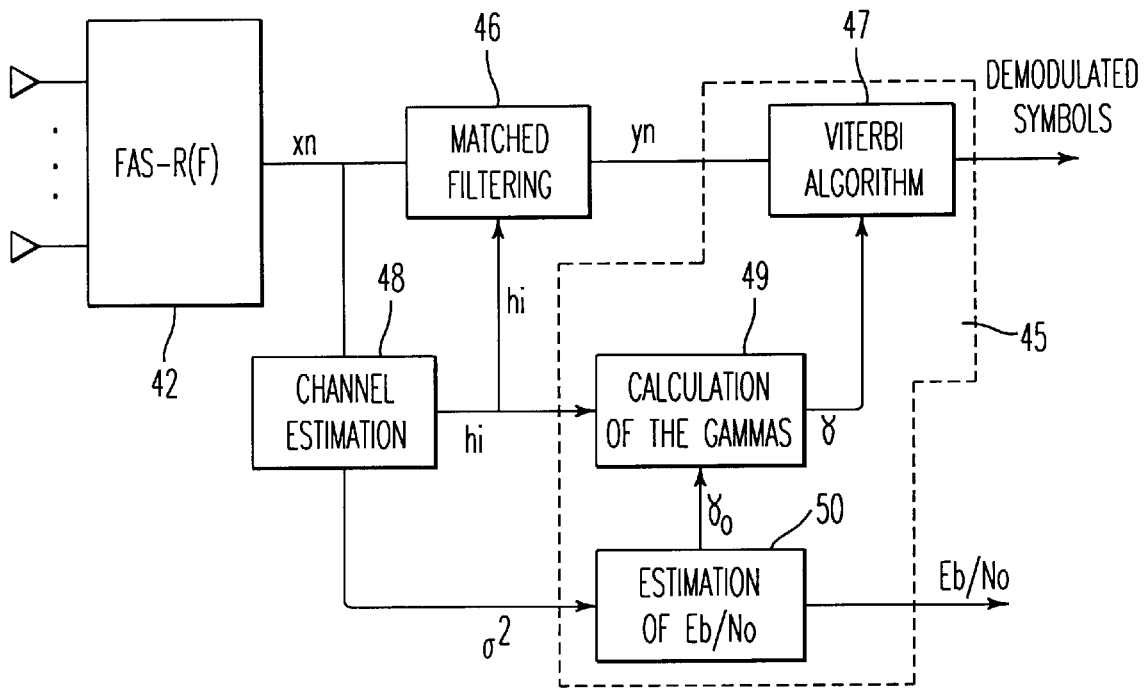

An embodiment of the equalization device 44 is represented in FIG. 21. It comprises a computing device 45 coupled to a device for spatial filtering by replica 42 by way of a matched filter 46 and of a channel estimation device 48. The computing device 45 carries out the one-dimensional equalization of the signals output by the spatial filtering for each of the sources detected. To do this it comprises a signal processor 47 suitably programmed according to the known Viterbi algorithm and coupled on the one hand to the spatial filter 42 across the matched filter 46 and on the other hand to a channel estimation device 56 across a device for computing the coefficients γ 49 required for executing the Viterbi algorithm. A device for computing an estimate of the signal-to-noise ratio 50 is likewise coupled at output to the computing device 49 and to the output of the channel estimation device 56. The processor 47 determines the symbol sequence transmitted which minimizes the probability of decision error. The one-dimensional equalization can also be carried out by other types of algorithms which are less complex numerically than the Viterbi algorithm and which are used for single-sensor reception, such as that known as the "M.algorithm" which is a simplified version of the Viterbi algorithm or else the DFE equalizer, although these equalizers lead to slightly worse results than those obtained with the Viterbi algorithm. They may however be used for applications in which the available computing power is insufficient to implement the latter algorithm.

The principle of the one-dimensional equalization which is performed by the processor 47 is described below taking GMSK modulation as modulation template. In what follows ($d_n$) denotes the string of bits transmitted, taking '0' or '1' values and it is assumed that the data dn are coded differentially before being modulated The information transmitted therefore consists of the string ($a_n$), computed from the string ($d_n$) through the following formulae:

$a_n = 1$ if $d_n = d_{n-1}$ and $a_n = -1$ if $d_n \neq d_{n-}$. $\quad(1)$

It is recalled here that GMSK modulation is a continuous-phase modulation which may be expressed in an approximate manner in the form of a linear modulation such as is described in the article by M. P. A. LAURENT, entitled: "Exact and approximate construction of digital phase modulations by superposition of amplitude modulated pulse (AMP)", IEE Trans. Comm. vol 34 (1986) pp 150–160.

Calling the modulated signal Z(t), the latter is of the form:

$$z(t) = \sum_n j^n b_n C_O(\tau) \quad \text{with} \quad b_n = \prod_{k \leq n} a_k. \quad (2)$$

where Co(t) is the first main function of the GMSK modulation.

The modulated signal z(t) can also be written in the form of a convolution product, by writing $s_{n-j}{}^n$ $b_n$, through the relation:

$$z(t) = \left(\sum_n s_n \delta(\tau)\right) \cdot C_O(t) = s(t) \cdot C_O(t) \quad \text{with} \quad s(t) = \sum_n s_n \delta(\tau) \quad (3)$$

in which the string ($s_n$) constitutes the string of symbols transmitted. The demodulation consists in determining the string ($s_n$) and in then backtracking to the string of bits transmitted ($d_n$).

The signal transmitted z(t) arrives at the reception network comprising K sensors, after having passed through the mobile radio propagation channel. The multisensor signal received is expressed in terms of the signal s(t) by the relation:

$X(t) = [X_1(t), \ldots, X_k(t)]^T = s(t)*G(t) + B(t),$ where:

G(t) is the multisensor channel received, consisting of the overall transmission waveform $C_0(t)$, of the transmission filter, of the propagation channel and of the reception filter, $X_i(t)$ is the signal received on sensor i, B(t) is the total noise vector composed of the background noise and of any jamming signals (it should be noted that each of the signals received by the network is a useful signal when it is to be demodulated or a jamming signal when some other signal is to be demodulated).

X(t) can also be written as a function of the symbols transmitted according to the relation:

$$X(t) = \sum_n s_n G(t - nTs) + B(t). \quad (4)$$

where Ts is the symbol period.

The single-sensor equalization of the output signal from the spatial filter $x(t) = W^+ X(t)$ is obtained by using a Filter Matched to the channel 46, the expression for the transfer function of which is given by a relation of the form:

$h(t) = 1/s^2 g(t),$ $\quad(5)$ where W e $S^2$ is the power of the noise $b(t) = W^+ B(t)$ at the output of the spatial filter, and $g(t) = W^+ G(t)$ is the useful channel at the output of the spatial filter.

The processor 47 determines the symbol sequence transmitted. It is programmed according to the Viterbi algorithm, a description of which may be found in the article by M. J. G. PROAKIS, entitled "Adaptive Equalization for TDMA Digital Mobile Radio", IEEE Trans. on Vehicular Techn., vol 40, No. 2, May 1991 [5]. This algorithm makes it possible, on the basis of a sequence of symbols ($y_n$) obtained at the output of the matched filter 46, to find the sequence ($s^{k0}_n$) with index $k_0$ which minimizes the probability of a decision error in the sequence of symbols transmitted, or else equivalently which maximizes the following criterion;

$$\begin{cases} kO = \arg\text{MAX}_k \left\{ j^k(X) = \sum_n j_n^k(X) \right\} \\ \text{avec}: j_n^k(X) = 2Re\left[ s_n^{k*}\left( y_n - \sum_{p<n} s_p^k \gamma_{n-p} \right) \right] - |s_n^k|^2 y_O \\ \text{où}: -\gamma_n = g^+(-\tau)^* h(t)_{t=nTs} \\ \phantom{\text{où}:} -y_n = h^+(-\tau)^* y(t)_{t=nTs} \end{cases} \quad (6)$$

The Viterbi algorithm works on the basis of the output signal $y_n$ from the matched filter 46 and the coefficients $\gamma_n$ obtained as output from the computing device 49.

By considering;

H the vector constructed from the temporal samples of the propagation channel at the output of the spatial filter 50 such that:

$$H = (g(0), \ldots, g[(L-1)Te])^T, \quad (8)$$

and writing:

$$S(n\,Te) = \{s(n\,Te), \ldots, s[(n-L+1)Te]\}^T$$

for the vector formed with the aid of the known symbols of the learning sequence, the processed signal may be written:

$$y(n\,Te) = H^H S(n\,Te) + b(n\,Te) \quad (9)$$

where Te represents the sampling period, a multiple of the symbol period Ts.

The channel estimate computed by the computing device 48 is obtained by applying the known Wiener formula, according to the relation:

$$H = R_{ss}^{-1} rs_y, \quad (10)$$

where the correlation matrix $R_{ss}$ and the cross-correlation vector $rs_y$ are estimated by the conventional unbiased estimator defined by the relation:

$$R_{SS} = \frac{1}{N} \sum_{n=0}^{N} S(nTe)S(nTe)^H \quad (11)$$

$$r_{Sy} = \frac{1}{N} \sum_{n=0}^{N} S(nTe)y(nTe)^*$$

where the operator "H" represents the operation of transposition/conjugation.

The estimate is made over the 16 bits placed at the centre of a TSC learning sequence (i.e. over N=32 samples when Te=2Ts) or over the last 59 bits of the SCH learning sequence (N=2×59=118 when Te=2Ts), The estimate of the propagation channel makes it possible to obtain an estimate of the samples of the noise power through the formula:

$$S^2 = \frac{1}{N} \sum_{n=0}^{N} [y(nTe)]^2 - rSy^M RSS^{-1} rSy. \quad (12)$$

This computation is performed by the computing device 48 which applies this result to an input of the device for computing the signal-to-noise ratio 50.

The coefficients of the filter matched to the channel 54 are obtained by applying the formula (5) according to the relation:

$$h(i\,Te) = 1/s^2 g(i\,Te) \quad (14)$$

The coefficients $\gamma_n$ used by the Viterbi algorithm are obtained through the formula (6), which is also expressed in the following manner:

$$\gamma_n = \sum_{i=0}^{L-1-2n} g^*(iTe)h((2n+i)Te) \quad (15)$$

These coefficients represent the IIS template at the output of the spatio-temporal filter 42 which is to be processed by the one-dimensional equalizer.

(The factor 2n is due to the fact that the coefficients used by the Viterbi algorithm are computed at the symbol rate).

The signal-to-noise ratio at the output of the spatial filter 42 is equal to the coefficient $\gamma_0$. This noise is to a first approximation composed only of background noise, since the interference consisting of the other transmissions is rejected. The coefficient $\gamma_0$ consequently constitutes an estimate of the signal-to-background noise ratio at the output of the spatial filter.

Assuming that the network of sensors receives two transmissions on the same channel, at the output of the spatial filter 42 computed for transmission k (k=1 or 2), the signal-to-background noise ratio may be estimated by the formula:

$$S/Bk = (pk/S^2)(1-a^2)$$

where pk is the total power received on the K sensors of the network, for transmission k, and $a^2$ is the spatial correlation between the two transmissions (scalar product squared of the two normalized direction vectors).

A comparison between the signal-to-noise ratios S/B1 and S/B2, by the computing device 58, makes it possible to deduce the ratio C/I of the power of the transmission emanating from the server cell to the power of the transmission emanating from the interfering cell.

The absolute power in dBm of each source can also be estimated: it is roughly equal to the sum of the noise level in dBm present on each sensor (known as a function of the gain) and of the ratio S/Bk. This quantity constitutes an approximation of the signal-to-noise ratio, which has to be corrected by taking account:

of the fact that the estimator reaches a ceiling for high values of the ratio S/B, of the fact that the power pk is the total power received (and hence is K times greater than the mean power received on each sensor), of the factor $1-a^2$.

The first two phenomena can be taken into account through calibration by injecting a signal of known level into the input of the receivers and by comparing the estimated level in dBm with the level actually injected.

What is claimed is:

1. A method of analyzing interference in a cellular radio communication system including beacon frequencies and traffic frequencies such that the method, to search on a specified analysis frequency and inside a cell for an origin of interference caused by neighboring cells, comprises:

performing a multipath synchronization on learning sequences of the beacon frequencies so as to determine a number of base stations using the specified analysis frequency as a beacon frequency;

demodulating, after spatial filtering, identifiers of the base stations transmitting the beacon frequencies on which a synchronization has been made; and performing a multipath synchronization on learning sequences of the traffic frequencies so as to determine a number of base stations using the specified analysis frequency as a traffic frequency.

2. The method according to claim 1, further comprising:

determining identifiers of the base stations using the specified analysis frequency as the traffic frequency by:

searching a set of frequencies of a network for the base stations which have a beacon frequency synchronous with the traffic frequency, demodulating results of the searching step after spatial filtering so as to obtain beacon frequencies and identities of the base stations; and preserving that which includes the specified analysis frequency from among the list of demodulated traffic frequencies.

3. The method according to claim 2, wherein to perform the multipath synchronization on the learning sequences associated with the beacon or traffic frequencies in the presence of jammers, the method comprises:

estimating a correlation matrix $\hat{R}_{xx}^{-1}$ of signals received on a set of N sensors;

calculating an inverse correlation matrix $\hat{R}_{xx}^{-1}$ in calculating cross-correlation vectors $\hat{r}_{xd}^+$ between signals $X_{(k)}$ received on the set of N sensors and a known learning signal d(n);

calculating a multiplier synchronization criterion by taking a scalar product of the cross-correlation vector $\hat{r}_{xd}^{-1}$ and a vector obtained from a product of the inverse of the correlation matrix $\hat{R}_{xx}^{-1}$ and a transposed conjugate cross-correlation vector $\hat{r}_{xd}^+$; and comparing a value of the criterion obtained with a threshold value η determined so as to place a synchronization on a sample (P) of the signal for which the value of the criterion exceeds the value of the threshold η.

4. The method according to claim 2, wherein on a beacon frequency the demodulation of the signaling messages indicating the associated traffic frequencies and the identity of the base station is obtained by spatial filtering implemented by utilizing the learning sequence of the beacon frequency to modify a reception diagram and separate various signals received by forming reception holes in a direction of the jamming signals produced by other base stations and jammers external to a network of the base stations.

5. The method according to claim 1, wherein to perform the multipath synchronization on the learning sequences associated with the beacon or traffic frequencies in the presence of jammers, the method comprises:

estimating a correlation matrix $\hat{R}_{xx}$ of signals received on a set of N sensors, calculating an inverse correlation matrix $\hat{R}_{xx}^{-1}$ in calculating cross-correlation vectors $\hat{r}_{xd}$ between signals $X_{(k)}$ received on the set of N sensors and a known learning signal d(n);

calculating a multiplier synchronization criterion by taking a scalar product of the cross-correlation vector $\hat{R}_{xd}$ and a vector obtained from a product of the inverse of the correlation matrix $\hat{R}_{xx}^{-1}$ and a transposed conjugate cross-correlation vector $\hat{r}_{xd}^+$; and comparing a value of the criterion obtained with a threshold value η determined so as to place a synchronization on a sample (P) of the signal for which the value of the criterion exceeds the value of the threshold η.

6. The method according to claim 5, wherein the learning sequence d(n) corresponds to a learning sequence of SCH and TCH signals of GSM and DCS1800 radio communication systems.

7. The method according to claim 6, wherein on a beacon frequency the demodulation of the signaling messages indicating the associated traffic frequencies and the identity of the base station is obtained by spatial filtering implemented by utilizing the learning sequence of the beacon frequency to modify a reception diagram and separate various signals received by forming reception holes in a direction of the jamming signals produced by other base stations and jammers external to a network of the base stations.

8. The method according to claim 5, wherein on a beacon frequency the demodulation of the signaling messages indicating the associated traffic frequencies and the identity of the base station is obtained by spatial filtering implemented by utilizing the learning sequence of the beacon frequency to modify a reception diagram and separate various signals received by forming reception holes in a direction of the jamming signals produced by other base stations and jammers external to a network of the base stations.

9. The method according to claim 1, wherein on a beacon frequency the demodulation of the signalling messages indicating the associated traffic frequencies and the identity of the base station is obtained by spatial filtering implemented by utilizing the learning sequence of the beacon frequency to modify a reception diagram and separate various signals received by forming reception holes in a direction of the jamming signals produced by other base stations and jammers external to a network of the base stations.

10. The method according to claim 9, further comprising:

implementing a spatial method of filtering by replica, by involving a path of highest power determined from the multipath synchronization, for matching the spatial filter.

11. The method according to claim 9, further comprising:

using a spatial method of filtering by filtered replica which makes it possible to involve a set of useful paths for matching the spatial filter.

12. The method according to claim 7, further comprising:

performing a one-dimensional equalization of the signals obtained by spatial filtering.

13. A device for analyzing interference in a cellular radio communication system including beacon frequencies and traffic frequencies, comprising:

a network of antennas coupled to a multipath receiver for the synchronous reception of signals received by each of the antennas; and a digital processing rig coupled to the multipath receiver and to a storage interface, wherein, to search on a specified analysis frequency while inside a cell for an origin of interference caused by neighboring cells, the device:

performs a multipath synchronization on learning sequences of the beacon frequencies so as to determine a number of base stations using the specified analysis frequency as a beacon frequency, demodulates, after spatial filtering, identifiers of the base stations transmitting the beacon frequencies on which a synchronization has been made, and performs a multipath synchronization on learning sequences of traffic frequencies so as to determine a number of base stations using the specified analysis frequency as a traffic frequency.

14. The device according to claim 13, wherein the digital processing rig determines, in a GSM and DCS1800 network, on beacon-type channels, an identification word BSIC of the cells, which is obtained after demodulating SCH bursts, and determines the identity CI and the locating code LAC of each cell, which are obtained after demodulating BCCH bursts.

15. The device according to claim 13, wherein the antennas of the network of antennas are spaced apart by a distance greater than 0.5 times the largest wavelength of the frequencies used in the radiocommunication system.

16. The device according to claim 13, wherein the multipath receiver comprises a message extraction and decoding device coupled to a spatial filtering device by way of a one-dimensional equalization device comprising a processor programmed according to the Viterbi algorithm.

* * * * *